United States Patent [19]
Kane

[11] Patent Number: 6,012,568
[45] Date of Patent: Jan. 11, 2000

[54] ADJUSTABLE CONVEYOR

[76] Inventor: Joseph R. Kane, 1293 Tracie Dr., Lake Zurich, Ill. 60047

[21] Appl. No.: 08/820,356

[22] Filed: Mar. 12, 1997

Related U.S. Application Data

[60] Provisional application No. 60/013,506, Mar. 15, 1996.

[51] Int. Cl.[7] .................................................. B65G 21/20
[52] U.S. Cl. ........................................ 198/817; 198/861.1
[58] Field of Search ............................... 198/817, 861.1, 198/588, 631, 584, 594; 29/2.17, DIG. 99

[56] References Cited

U.S. PATENT DOCUMENTS

| | | | |
|---|---|---|---|
| 4,300,895 | 11/1981 | Meenen | 198/861.1 X |
| 4,349,097 | 9/1982 | Curti | 198/586 X |
| 4,511,028 | 4/1985 | Meister | 198/817 X |
| 5,009,306 | 4/1991 | Roderick et al. | 198/817 X |
| 5,127,516 | 7/1992 | Hayashida | 198/861.1 X |
| 5,813,518 | 9/1998 | Kirker | 198/817 |

FOREIGN PATENT DOCUMENTS

| | | | |
|---|---|---|---|
| 3537135 | 4/1987 | Germany | 198/861.1 |
| 143805 | 8/1984 | Japan | 198/817 |
| 51407 | 3/1986 | Japan | 198/817 |
| 215605 | 8/1990 | Japan | 198/817 |
| 144818 | 5/1992 | Japan | 198/861.1 |

*Primary Examiner*—Frank E. Werner
*Attorney, Agent, or Firm*—Joseph T. Kivlin, Jr.

[57] ABSTRACT

An adjustable conveyor for use in the manufacture of printed circuit boards to interconnect workstations separated by varying distances, which has a pair of longitudinally extensible belts for edge supporting such circuit boards, with a tensioning adjustment on each belt, and which has a lateral adjustment to accommodate circuit boards of different widths as well as to perform other operations.

7 Claims, 3 Drawing Sheets

ADJUSTABLE CONVEYOR

This application claims benefit of provisional application Ser. No. 60/013,506 filed Mar. 15, 1996.

BACKGROUND OF THE INVENTION

In many manufacturing applications, whether automated or manual, it is common to interconnect work cells or workstations in a production line by means of a conveyor which can automatically move product from one station to the next. Each of such work stations or cells has a particular function in the manufacturing operation, and may have a unique physical shape or size. Upgrading or modification of any cell in the production line sometimes requires that it be replaced by one having a different size, mandating a change in the size of the conveyor interconnecting the work cells.

In the manufacture of printed circuit boards (PCBs), which often have delicate components on both sides of the board, it is also common to require that the adjacent machines or work cells be placed as close as possible to each other, because of difficulty in transferring product from one work cell to the next. Moreover, many of the automated machines required to build this type of product are so large as to make them difficult to install in a precisely accurate location.

Until the time of this invention, users confronted with this problem had only two choices. They could design their production lines to use interconnecting conveyors available in a standard length, requiring all work cells be installed with spacing to utilize one of the standard sizes. However, replacement of a work cell with one having a different size could require the relocation and reinstallation of all downstream work cells in order to maintain a continuous production system.

A second prior art solution to the problem has been to use a conveyor custom designed with a length to fit optimally between adjacent work cells. However, the high cost in time and money of a custom designs makes this approach unacceptable to small users and to large users, who frequently change the flow of their products.

SUMMARY OF THE INVENTION

The conveyor of the present invention is adjustable and is capable of transporting printed circuit boards, or similar delicate objects of varying width and/or length by supporting them at their edges. The transport mechanism permits smooth flow with no contact with any part of the product except for those edges which are parallel to the direction of transfer. Transport is accomplished by an endless thin belt or chain located beneath the two supporting edges, but optionally, it may be supplemented with a belt or chain located at the top edge surface or by an additional belt or chain located along the underside of the product near its center, a practice sometimes referred to as "center support" which is not uncommon in edge conveying systems for PCB's.

It is therefore an object of this invention to provide conveying equipment for delicate objects, such as PCBs with the capability for easy adjustment to interconnect adjacent workstations.

It is also an object of this invention to provide equipment for the handling of such objects, without damaging the same or any of the elements thereof.

Finally, it is an object of this invention to eliminate the need for standardized spacing between work stations and for costly customized conveying equipment.

In accordance with these objects, this invention relates to an edge supporting conveyor with at least two parallel extensible edge rails, each having at least two sections which can be extended in opposite directions, and having a belt or chain trained around bearings and pulleys mounted on each of the parallel rails, at least one of which is driven by a motor. A single motor may be used to drive the chain or belt of multiple parallel rails by employing a shaft attached through the drive axis to extend between the parallel rails.

The parallel rails are attached to a rail support member or members and a structural frame which can be permanently located between adjacent work cells. The rail support member(s) provides both support and alignment between the end-to-end extensible rails which are adjustably attached to the support members by suitable fastening means. A single belt or chain is trained around the pulleys, bearings and around a tensioning and slack removal device on each set of extensible rails. This device permits modification of the length of the conveyor without replacing the belt, and it also provides proper tension on the belt. The tensioner can be spring loaded or it may be manually adjusted.

The delicate nature of many products transferred on this type of conveyor requires a very smooth transfer surface and movement. It is therefore critical that there be no abrupt or uneven variation in the level of the transfer surface. Most prior art conveyors having an adjustable length were designed to move large or heavy items which can tolerate rough transitions between work stations and the adjustable sections of the conveyor. None provide a perfectly smooth transfer surface or a sufficiently narrow edge support as is required to transfer PCBs between work stations.

The edge transport conveyors must be designed to provide a continuous support rail beneath the belt or chain to allow it to bear weight without deflection from the plane of travel. In prior art construction for PCB conveyors, the support rail is nearly coextensive with the belt, the ends being aligned with and located very close to the top tangential edges of the end bearings or pulleys.

In contrast, the present invention provides a perfectly smooth surface without using a coextensive support rail. When the length of the conveyor is to be extended, only the conveyor rail carrying the belt or chain is extended, leaving a gap between the end of the support rail and the extended end of the belt or chain. Deflection of the transfer surface of the belt or chain is minimized merely by increasing the tension of the belt or chain. In other words, the tensioning of the belt or chain is sufficient to substantially prevent it from sagging in the gap near its extremity.

The present invention is capable of handling extremely thin printed circuit boards, i.e., boards having a thickness on the order of a few thousandths of an inch. This is made possible by the use of a narrow belt or chain, and an alignment cap, located entirely outboard of the belt or chain instead of above it, as is commonplace in the prior art. The narrow belt or chain does not interfere with any components attached to the bottom of the PCBs. The alignment cap guides the outside edges of both the belt/chain and the PCBs during transport, keeping the latter aligned parallel to the direction of travel.

The prior art PCB conveyors have employed relatively wide belts which are partially covered by alignment caps mounted outboard of the belt, leaving only a small portion of the belt exposed to view. It is the exposed portion which is intended to support the PCBs. However, caps in such structures sometimes create a problem, because of the clearance which must be allowed for variations in the thickness of the belt, and/or for the thickness of the seam by which the ends of the "endless" belt are sometimes connected. The space between the cap and belt occasionally becomes jammed with PCBs when their thickness approximates such tolerance space.

BRIEF DESCRIPTION OF THE DRAWINGS

A more complete understanding of the nature of the present invention may be gained by referring to the Detailed Description thereof, and the accompanying drawings, wherein:

FIG. 5 is a cross section of rail assembly 50, taken along line 5—5 in FIG. 1, showing an end view of one of the extruded rails.

DETAILED DESCRIPTION OF THE INVENTION

Figure 1:
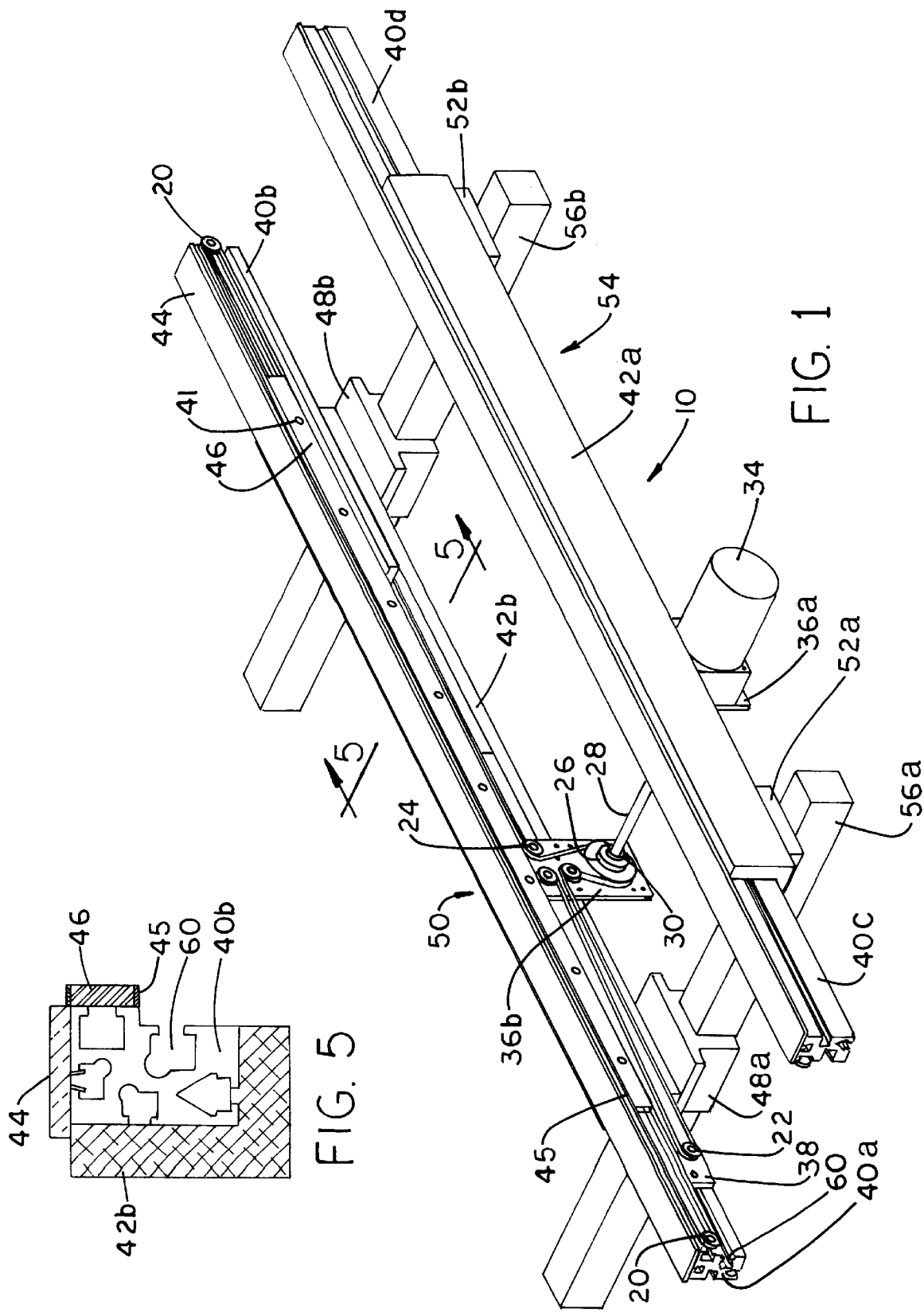
FIG. 1 is a perspective view of the extensible conveyor of this invention, showing the device in an extended position.

The adjustable length conveyor of this invention is indicated generally at 10 in FIG. 1. It serves as an interconnecting conveyor between a pair of complex work cells for printed circuit boards. Such work cells would be located at each side of the structure shown, with the fixed rail assembly 54 being aligned along the front edges of the adjacent work stations.

Figure 2:
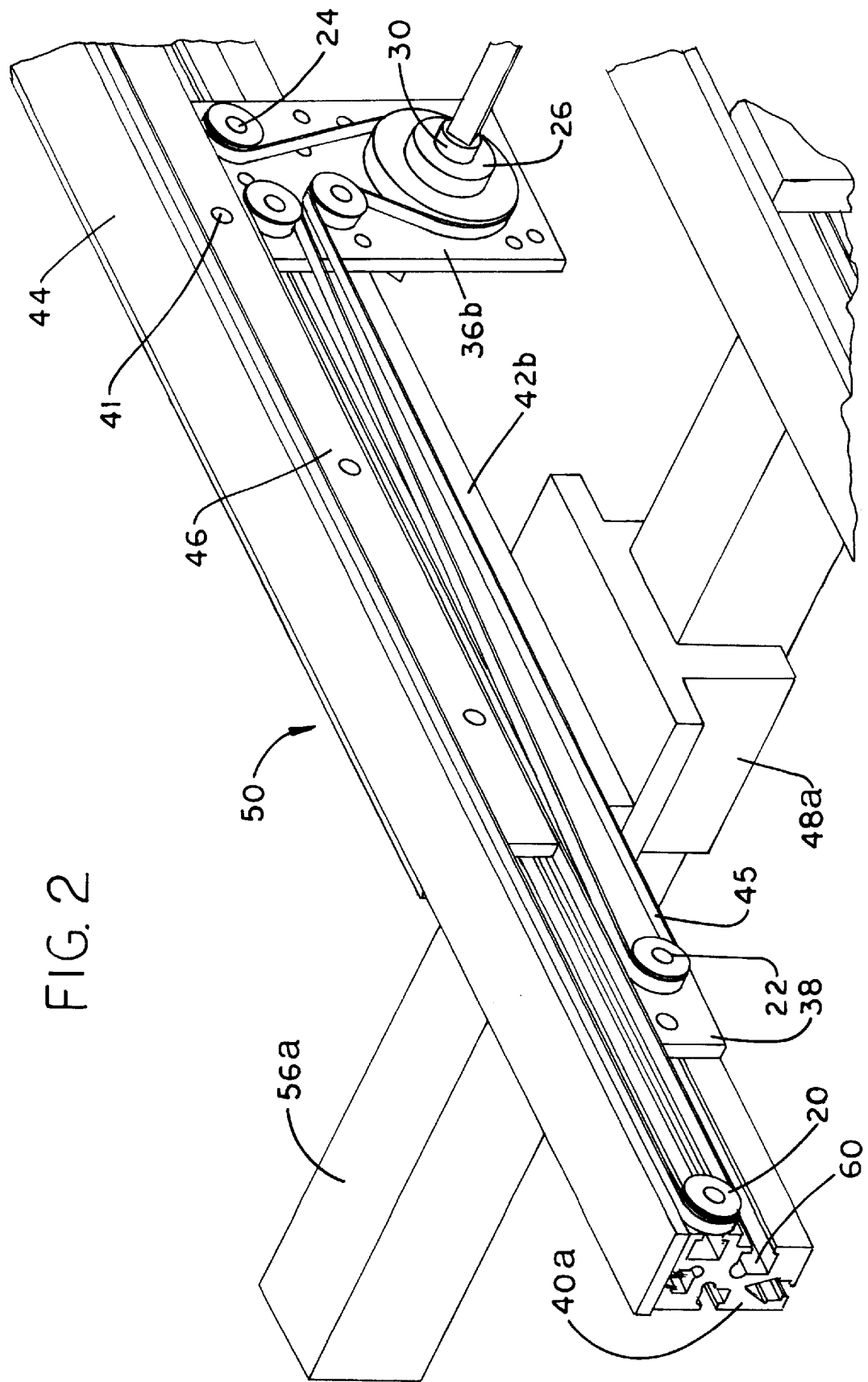
FIG. 2 is an enlarged perspective showing a portion of said conveyor.

Rail assemblies 50 and 54, each comprises a support rail 42b and 42a respectively, a pair of extruded rails 40, belt 45, belt bed 46, and guide cap 44. Corresponding components of each rail assembly are differentiated from one another in the drawings by letters following the numerical designation. In rail assembly 50, as best seen in FIG. 1, extruded rails 40a and 40b are separated from one another when belt 45 is extended to abut the adjacent work stations. Belt 45 is supported by belt bed 46, at the point where such extruded rails are separated as a result of such extension. Belt bed 46 is adjustably attached to extruded rail 40a and 40b. Extruded rail 40a also carries drive plate 36 and belt tensioner plate 38, both of which are also adjustably attached to extruded rail 40. This arrangement is most clearly shown in FIG. 2.

It is common to allow PCB's of varying width to be handled by a single conveyor. This is accomplished in the present invention by providing for an adjustment in the width of the conveyor. As shown in FIG. 1, the fixed rail assembly 54 is attached through its support rail 42a at each end to the width adjust guide rails 56a and 56b through a pair of mounting blocks 52a and 52b. The desired width adjustability is achieved by attaching each end of adjustable rail assembly 50 and its corresponding support rail 42b through adjustable mounting blocks 48a and 48b. The width of the conveyor can then be modified by moving rail assembly 50 to the desired position on the width adjust guide rails 56a and 56b.

Power is provided by a single motor 34, mounted on fixed rail assembly 54 by means of drive plate 36a and having a drive pulley corresponding to 26, shown on drive plate 36b of adjustable rail assembly 50. A square drive shaft 28 is mounted on the drive axis of motor 34 and extended through a shaft sleeve 30 which is inserted into drive pulley 26. Bearings 24 are also mounted on drive plate 36. Shaft sleeve 30 can be located anywhere along the square drive shaft 28 to provide transfer of power at any desired width. Belt 45 is trained around the drive pulley 26, drive plate bearings 24, tensioner bearing 22, and end bearings 20 for each of the rail assemblies 50 and 54.

Belt 45 is preferably a rubber based material, having appropriate strength and flexibility, and it must be static dissipative. It passes over the belt bed 46 and is trained between the two end bearings 20 of each respective rail assembly 50 and 54. Belt bed 46 provides support for belt 45 and for each PCB during movement along much of the length of conveyor 10, between each pair of extruded rails 40.

Figure 3:
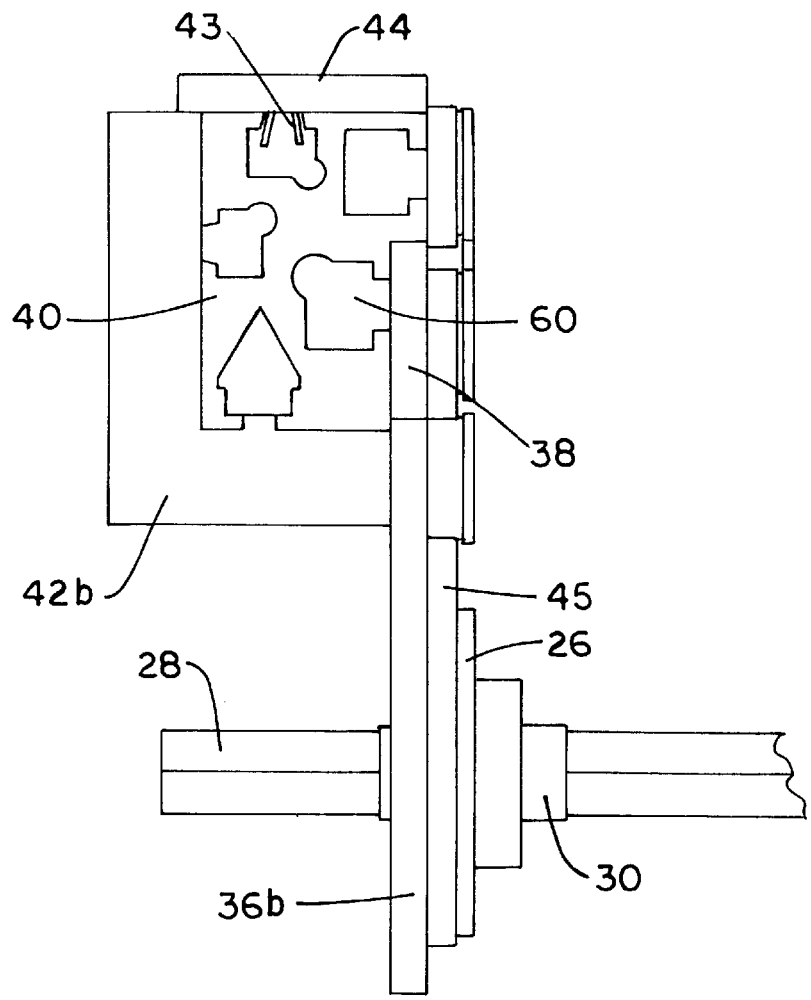
FIG. 3 is an end view, showing the configuration of the channels which extend for the length of each extruded rail.

All of the channels visible in FIG. 3, showing an end view of rail assembly 50, extend for the entire length of extruded rail 40a. Channels of the same shape extend also through the other three extruded rails 40b, 40c, and 40d, with those in 40b appearing in an end view thereof visible in FIG. 5. These channels contain the fasteners which are used to attach components such as the belt tensioner plate 38, belt bed 46, and end bearings 20 to the extruded rails 40. Not all of said channels have the same configuration, they all serve the same purpose in the present invention, i.e. to hold a square nut.

Figure 4:
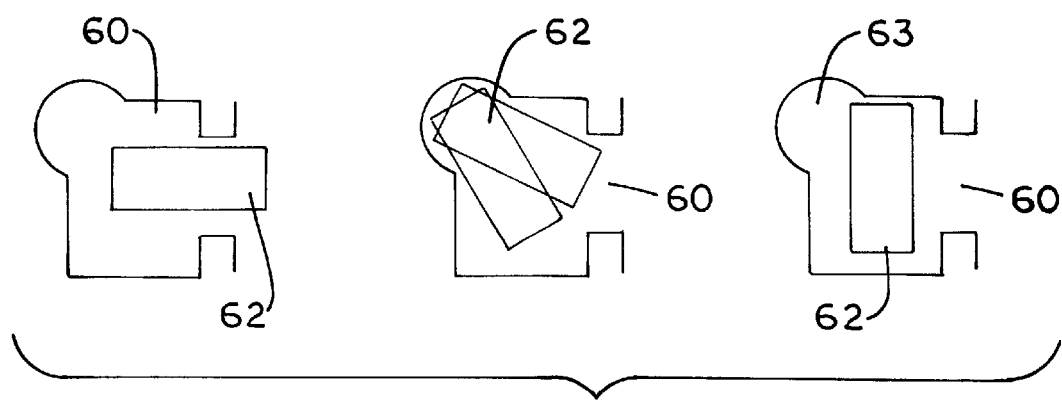
FIG. 4 is an enlargement of a portion of FIG. 3, showing said channel configuration.

Channels 60, and those having a similar cross section, seen best in FIGS. 3 and 5, are uniquely designed to allow the easy insertion of a common square nut at any point along the length of the channel, rather than following the common practice of inserting at one end and sliding the nut to the desired position in the channel. According to this invention, as shown in FIG. 4 a standard square nut 62 is inserted by turning it so that its smallest dimension fits through the lateral opening in the channel, then pushing it into the opposing enlarged arcuate space 63 of the channel until the outer edge of the nut clears the lip of the lateral opening of the channel. Thereupon the nut falls into place so that two of its opposing faces abut the parallel planes of the channel. As a result, the hole in the nut becomes aligned with the lateral opening of the channel for receiving a bolt or other threaded element to be attached.

According to this invention, adjustment of the length of the rail assemblies is accomplished by loosening the fasteners which attach belt bed 46 and belt tensioner plate 38 to rail assemblies 50 and 54 through extruded rails 40. Loosening the fasteners (not shown) which attach extruded rails 40 to support rails 42 allows the extruded rails to be extended or retracted relative to support rails 42 to the length needed to interconnect a pair of work stations. After the extruded rails are extended or retracted to the desired length, the fasteners are re-tightened. Thereafter, belt bed 46 and tensioner plate 38 have their fasteners, represented in FIG. 2 by circles 41, loosened and are moved to the desired location along the length of extruded rails 40. Belt bed 46 can be positioned where desired to provide support for endless belt 45, and tensioner plate 38 can be located so as to lengthen or shorten belt 45 and to provide the necessary belt tension. Finally, fasteners 41 can be re-tightened to immovably affix said belt bed and tensioner plate.

Guide cap 44, as shown in FIGS. 3 and 5, is affixed by means of flanges 43 to the assembly by friction or a snap fit. Removal of guide cap 44 from the top of the extruded rails 40, and loosening the fasteners as described in the previous paragraph, allows complete freedom of movement of each of the extruded rails 40a, 40b, 40c, 40d along the length of the conveyor. Said extruded rails may be extended more from one end than the other of the supporting frame, allowing an "unbalanced" conveyor. All of said fasteners must then be re-tightened to hold the extruded rails 40a, 40b, 40c, 40d in their new position with respect to rail assemblies 50 and 54 and the structural frame of conveyor 10. Belt tensioner plate 38 should then be adjusted to a position which stretches belt 45 to about 105% of its relaxed length and tightened in that position.

The rail guide cap 44, which is a plastic extrusion, preferably an ultra high molecular weight polyethylene, (an ABS resin also being operable) can easily be cut to the length of the extended rail assemblies. It should then be replaced on the top of the extruded rails 40 on each of the rail assemblies 50 and 54. Rail cap 44 should be at least as long as rail assemblies 50 and 54 to enable it to guide belt 45 and the side surface of the edge of each PCB as it travels the length of the conveyor.

From the foregoing, it will be obvious that the conveyor of the present invention can be adapted to some uses other than interconnecting work stations. For example, the lateral adjustability of the support rails can be automated in such a way as to allow PCBs to be individually raised between them by pneumatic means from a supply source, and then placed upon the endless belt to initiate the production assembly. Moreover, the support structure for the adjustable conveyor of this invention is normally a freestanding frame, but it may also be integrated into a machine having a different function, thereby providing space adjustability to such machine.

It is also obvious that many modifications and variations of thepresent invention are possible in the light of the present teachings. It is therefore to be understood that within the scope of the appended claims, the invention may be practised otherwise than as specifically described herein.

What is claimed is:

1. In an adjustable conveyor for printed circuit boards to interconnect work stations of a production line, the improvement comprising providing said conveyor with a support structure having:

(a) a pair of parallel rail assemblies mounted on said structure;

(b) a continuous, horizontally-disposed flexible belt coextensive with each of said rail assemblies and carried thereby, for transporting said circuit boards for the length of said rail assemblies, each of said belts being rotatably mounted on pulleys and having an upper support portion for edge-supporting said printed circuit boards;

(c) each of sail rail assemblies having at each end thereof, an extruded rail for supporting each of said belts, each of said extruded rails carrying, at the extremity of said rail assembly, a pulley for said flexible belt, and each of said extruded rails being extendible to bridge the space to each adjacent work station of said production line;

(d) guide means, coextensive with each of said extruded rails and mounted thereon outboard of said flexible belt, for longitudinally guiding said belt and said circuit boards; each of said belts having independent tensioning means, and having mechanical means adapted to drive said belts in a coordinated manner.

2. The adjustable conveyor of claim 1, wherein each rail assembly is provided with means for supporting said flexible belt at said upper support portion where said portion is unsupported by the extension of said extruded rail.

3. The adjustable conveyor of claim 1, wherein at least one of said rail assemblies is provided with a mounting means on said support structure to permit lateral spacing of said rail assemblies.

4. The adjustable conveyor of claim 1, wherein said guide means consists of a polymeric plastic extrusion.

5. An adjustable conveyor for printed circuit boards to interconnect work stations of a production line, consisting of:

(a) a support structure;

(b) a pair of parallel rail assemblies mounted on said structure;

(c) a continuous, horizontally-disposed flexible belt coextensive with each of said rail assemblies and carried thereby, for transporting said circuit boards for the length of said rail assemblies, each of said belts being rotatably mounted on pulleys and having an upper support portion for edge-supporting said printed circuit boards;

(d) each of said rail assemblies having at each end thereof, an extruded rail for supporting each of said belts, each of said extruded rails carrying, at the extremity of said rail assembly, a pulley for said flexible belt, and each of said extruded rails being extendible to bridge the space to each adjacent work station of said production line;

(e) guide means, consisting of a polymeric plastic extrusion coextensive with each of said extruded rails and mounted thereon outboard of each of said flexible belts, for longitudinally guiding said belt and said circuit boards;

(f) each of said rail assemblies being provided with a belt bed for supporting said upper support portion of said flexible belt where said support portion is unsupported by the extension of said extruded rail;

(g) each of said rail assemblies being provided with mounting means on said support structure for laterally spacing said rail assemblies; each of said belts having independent tensioning means, and having mechanical means adapted to drive said belts in a coordinated manner.

6. The adjustable conveyor of claim 5, wherein each of said belt beds is bolted to each of said rail assemblies.

7. The adjustable conveyor of claim 5, wherein each of said metal extrusions has an opening extending throughout its length and having a configuration to permit the insertion and turning to a functional position of a square nut.

* * * * *